Aug. 3, 1965                    W. D. HUSTON                    3,198,010
                              LIQUID LEVEL GAUGE
Filed Feb. 19, 1962                                          2 Sheets-Sheet 1

INVENTOR.
WILLIAM D. HUSTON
BY
*B. E. Schlesinger*
Attorney

Aug. 3, 1965 W. D. HUSTON 3,198,010
LIQUID LEVEL GAUGE
Filed Feb. 19, 1962 2 Sheets-Sheet 2

INVENTOR.
WILLIAM D. HUSTON
BY
Attorney

United States Patent Office 3,198,010
Patented Aug. 3, 1965

3,198,010
LIQUID LEVEL GAUGE
William D. Huston, Rochester, N.Y., assignor to American Radiator & Standard Sanitary Corporation, New York, N.Y., a corporation of Delaware
Filed Feb. 19, 1962, Ser. No. 174,053
8 Claims. (Cl. 73—313)

The present invention relates to gauges and more particularly to liquid-level gauges. More specifically, the invention relates to a float-operated type of liquid-level gauge, such as may be employed, for instance, in measuring the level of oil in a household fuel oil tank. In a still more specific aspect the invention relates to a liquid level gauge in which the drive to the indicating mechanism of the gauge includes magnetically-coupled drive and driven magnets.

With household oil tanks, it is often desirable to be able to read the level of the oil in the tank, for instance, at a point remote from the tank. The oil delivery men, for example, may not want to tramp through the house with boots wet from rain or snow to read the gauge on the tank, and the householder may also want to check the gauge without going down into the cellar himself. The same thing is true of other installations where liquid level gauges or other types of condition-responsive devices are employed. It is often desirable to read the gauge at a point remote from the position where the gauge itself is mounted.

Heretofore one drawback to remote indicating gauges, particularly liquid level gauges, has been the difficulty of providing satisfactory means for remote indication while at the same time allowing reading of the level of liquid at the storage tank itself. A householder, for instance, may want to read the gauge if he happens to be in the cellar, and may not want to go to the point of remote indication.

Another difficulty heretofore has been the problem of providing a satisfactory remote-indicating sender. Usually a variable resistor is employed to control the remote indicator. The moving contact arm of the resistor is actuated by the driven magnet of the gauge, and the resistor is wired into the circuit to the remote indicator. It is difficult to make such apparatus rugged and compact. Difficulties are encountered in such apparatus, also, with friction, which will reduce the sensitivity of the sender unit.

One object of the invention is to provide a gauge, and particularly a liquid level gauge which can be connected for remote indication and which at the same time is constructed so that its measurements can be read directly from the gauge proper itself.

Another object of this invention is to provide a liquid-level gauge of the character described which will be compact, rugged, relatively easy to handle, and which will be capable of withstanding abuse.

Another object of the invention is to provide a gauge of the character described having a variable resistor as the means for controlling the remote indication, but wherein, with a minimum number of parts, friction will also be reduced to a minimum.

Other objects of the invention will be apparent hereinafter from the specification and from the recital of the appended claims, particularly when read in conjunction with the accompanying drawings:

Figure 1:
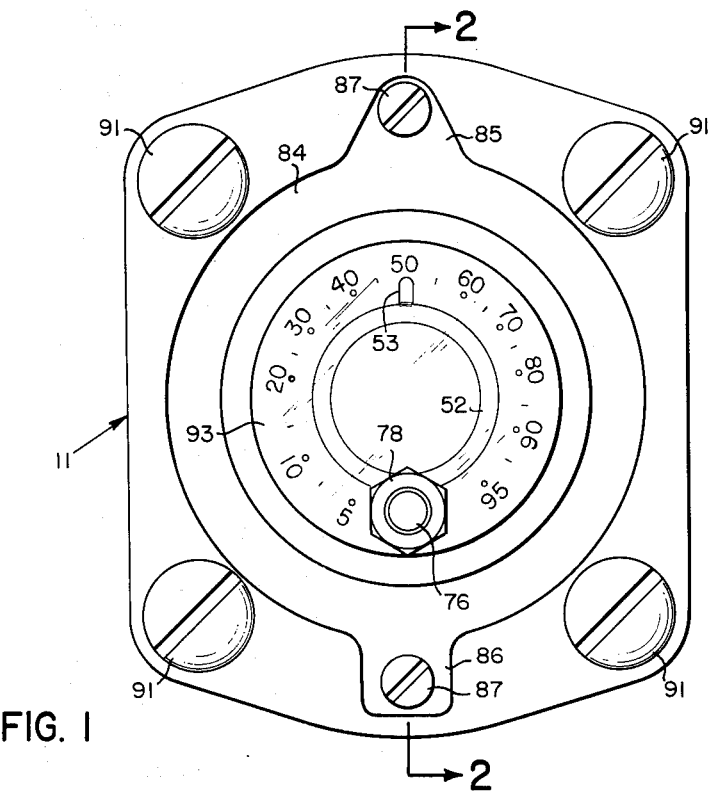
FIG. 1 is a front elevational view of a gauge made in accordance with one embodiment of this invention and showing the graduations on the face of the gauge and the pointer which reads thereagainst, as well as the resistance coil used in operating the remote indicator.

In the embodiment of the invention illustrated in the drawings, the gauge includes a head which is recessed at its front or top to provide a cavity within which the indicator unit seats. The head has the upper end of a tubular column or post projecting into it; and within this column or post is journaled the float-operated transmission or operating shaft of the gauge. The operating shaft has a first magnet secured to its upper end; and mounted in the cup-shaped recess in the gauge head is a cup-shaped casing that is graduated on its upper face to constitute the indicator dial of the gauge. Riveted in the cup-shaped casing to project upwardly is a post on which a second magnet is rotatably mounted. The second magnet is magnetically coupled to the first magnet to rotate with the first magnet upon rotation of the first-named, float-operated, magnet. A pointer is secured to the second magnet to read against the graduations in the cup-shaped casing and thereby indicate the position of the float. A contact member is also connected to the second magnet to rotate therewith. The position of this contact member corresponds at any time to the position of the pointer since both are connected to the second magnet to rotate therewith. The contact member rides on a resistance coil; and the contact member and resistance coil constitute together a variable resistor which is in circuit with a remote electrically-operated indicator, such as a conventional ammeter. This circuit is grounded through a wiping contact which is secured to the second magnet and which wipes across said post. Thus, in effect, a slip ring action is achieved which results in a minimum of friction. The resistance coil is mounted in a recess in the transparent cover for the gauge. The transparency of this cover permits reading of the position of the pointer against the graduations on the cup-shaped casing; while the variable resistor varies the position of the ammeter pointer or needle. Thus, the gauge can be read both at the gauge face and also at the remote point where the ammeter or other electrically-operated indicator is positioned.

Figure 2:
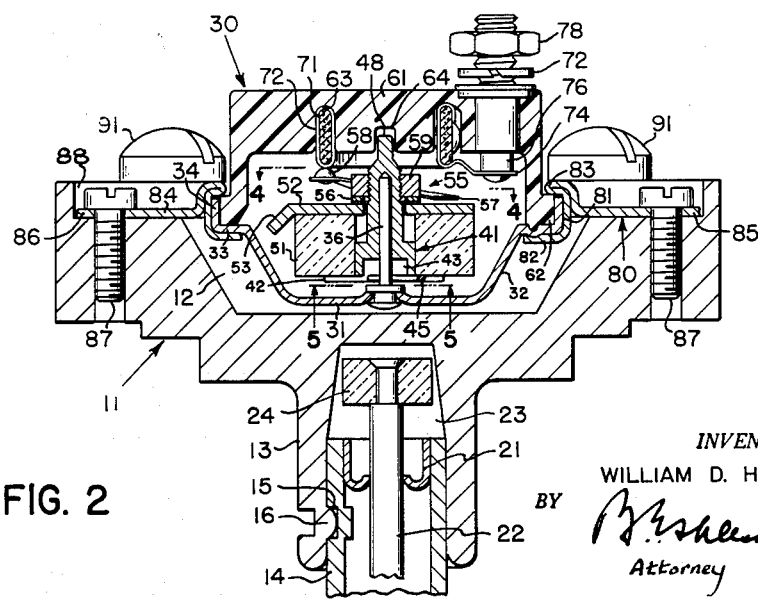
FIG. 2 is a sectional view taken along the line 2—2 of FIG. 1 and looking in the direction of the arrows.

Referring now to the drawings by numerals of reference, 11 designates the gauge head or casing. This gauge head or casing has a cup-shaped recess 12 (FIG. 2) in its front, top face, and a rearwardly-extending tubular projection 13. A tubular column 14 is inserted partway into the bore of the tubular projection 13. Column 14 has a recess 15 in its outer peripheral surface which is engaged by a boss or projection 16 on the inner surface of the tubular projection 13, to hold the column 14 against movement relative to the gauge head.

Rotatably mounted in an annular bearing 21 secured in the open, top end of column 14 is the upper end of a rotatable operating shaft 22. The upper end of operating shaft 22 extends upwardly beyond the column 14 into the bore 23 in the tubular extension 13. Riveted, or otherwise secured to this upper end of operating shaft 22 is an annular magnet 24. The opposite end of operating shaft 22 is secured through a conventional linkage (not shown) to a float (not shown) so that as the level of the liquid in the tank rises, operating shaft 22 and magnet 24 rotate in one direction, and as the level of the liquid falls, magnet 24 is rotated by shaft 22 in the opposite direction.

Suspended in the inverted frusto-conical recess 12 in the top or front of the gauge head is an indicator unit or assembly generally designated at 30. Unit 30 comprises a cup-shaped plate 31, which has a flat bottom positioned in spaced relation to the bottom of recess 12, and which has a generally conical wall 32 integral with its bottom and extending upwardly. Adjacent its opening the wall 32 of backing plate 31 is bent laterally outwardly to define a ring flange 33. This ring flange 33 terminates in an annular wall portion 34. The front or upper face of the wall 32 is graduated, as indicated in FIG. 1, and constitutes the indicator dial of the gauge.

Figure 4:
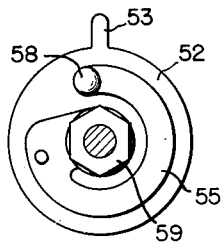
FIG. 4 is a partial sectional view taken along the line 4—4 of FIG. 2 and looking in the direction of the arrows and illustrating the contact and the gauge pointer.
Figure 5:
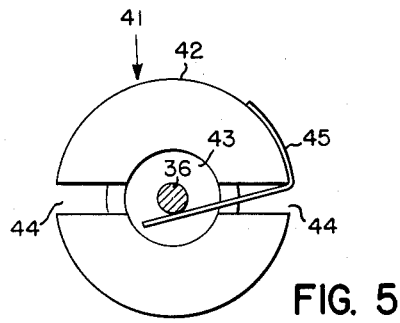
FIG. 5 is a greatly enlarged partial sectional view taken along the line 5—5 of FIG. 2 and looking in the direction of the arrows and showing the bushing and the grounding contact carried thereby.
Figure 6:
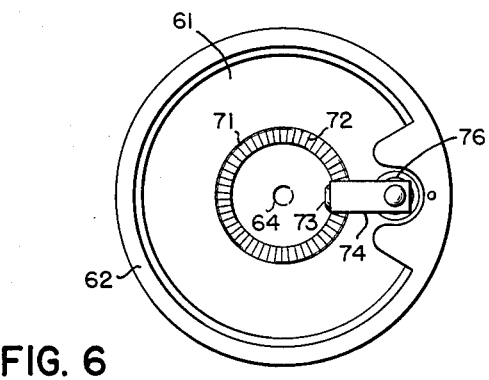
FIG. 6 is a bottom view of the plastic gauge cover shown in FIG. 2 and illustrating the resistance coil, its mounting in the cover, and its connection to the remote indicator.

Riveted in the bottom of the dial 31 and projecting upwardly coaxially thereof is a pivot pin or stud 36. A bushing 41 is mounted on pivot pin 36 for rotation thereabout. At its lower end bushing 41 terminates in a radially outwardly directed flange 42 which is spaced slightly above the bottom of dial plate 31. Bushing 41 is counterbored at its lower end, as at 43, and flange 42 has two diametrally opposed slots 44 (FIG. 5) therein which extend from the peripheral surface of the flange into the counterbored portion 43 of the bushing. A leaf spring 45 has one end thereof secured to the peripheral surface of flange 42 (FIG. 4) and the other end thereof extending through one of the slots 44 and counterbore 43 to engage pivot pin 36. This spring constitutes a wiping contact on pin or stud 36 to ground the electrical circuit as will be explained further hereinafter.

Figure 3:
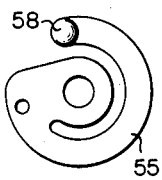
FIG. 3 is a detail view, showing in plan the contactor that cooperates with the resistance coil.

Adjacent its upper end bushing 41 has an externally threaded, reduced diameter portion; and it terminates in a further reduced diameter portion 48. An annular magnet 51 is mounted on bushing 41 with its lower face abutting against the flange 42 of the bushing. The magnet 51 is polarized so that it is magnetically coupled with magnet 24 on shaft 22. A ring-shaped disc 52 is loosely positioned over the externally threaded portion of bushing 41, and rests upon the upper face of magnet 51. Disc 52 has a slight radial projection 53 thereon that extends downwardly and that constitutes a pointer to read against the graduations on the upper face of the dial 31. Also mounted over bushing 41 but on top of disc 52 (FIGS. 3 and 4) is a leaf contact spring 55 which has a ring portion 56 that surrounds the bushing, and a helical portion 57 that extends upwardly and that carries at its extreme upper end an electrically conductive, silver contact point 58. A conventional nut 59 is threaded on the reduced diameter portion 47 of bushing 41 and into engagement with the ring portion 56 of contact spring 55 to secure spring 55, pointer disc 52 and magnet 51 to bushing 41 for rotation therewith about the pivot pin 36.

An inverted, cup-shaped cap 61 closes the upper end of dial plate 31. Cover 61 is made of a transparent plastic material and is provided at its lower end with an outwardly directed annular flange 62 which rests upon the flange 33 of dial plate 31. The outer peripheral surface of rib or flange 62 snugly engages the inner surface of the annular wall 34 of dial plate 31. Preferably a sealing material is interposed between the confronting faces of the flanges 33, 34 and 62 to prevent the entry of dust and moisture into the indicator assembly.

In its inner face, cap 61 has a relatively deep annular recess 63 coaxial of the pivot pin 36; and in its inner face cap 61 also has a centrally-disposed relatively shallow circular recess 64. Recess 64 is to accommodate the reduced diameter portion 48 of bushing 41.

Snugly positioned in the annular recess 63 of cap 61 is an annular core 71 of insulating material upon which is wound a bare, electrical resistance wire 72. The core projects slightly, axially beyond the inner, lower face of cap 61 a sufficient distance so that as the contact spring 55 rotates with magnet 51, the contact 58 will ride on the resistance wire 72. Resistance wire 72 is wound helically on the core; and one end of the wire is staked at 73 to an electrically conductive strap 74. Strap 74 projects laterally of the core 71, and is secured at its outer end to the lower end of the electric terminal post 76 which is secured in the cap 61. The post 76 extends out through the outer face of cap 61 and at its upper end is threaded to accommodate a conventional lock washer 77 and nut 78 for securing an electrical lead (not illustrated) to the post.

For suspending the indicator mechanism 30 firmly and securely in the recess 12 in the gauge casing or head 11 and for removably fastening the cap 61 on to the cup-shaped dial plate 31 a bezel 80 is provided. Bezel 80 has an annular wall portion 81 (FIG. 2) which at its bottom terminates in an inwardly directed ring flange 82. At its upper end the annular wall portion 81 of bezel 80 is folded in to engage over the top of the wall 34 of dial plate 31 and over the peripheral flange or rib 62 of cap 61. Bezel 80 has an outwardly directed marginal flange 84 adapted to be seated in recess 88 (FIG. 2) in the upper face of the gauge head 11. At diametrically opposite points thereon flange 84 has two differently shaped tabs 85 and 86 formed thereon, which seat in correspondingly shaped portions of recess 88. Flange 84 is secured to the head 11 by means of screws 87 which pass through these tabs. By merely removing the two screws 87, bezel 80 together with the entire indicator assembly 30 may be removed from the gauge casing 11 if desired.

Screws 87 and bezel 80 also serve to ground contact 58 to casing 11 through the electrically conductive contact spring 55, magnet 51, pin 36, wiper 45 (FIG. 5), and dial plate 31.

For bolting the gauge casing 11 to a liquid storage tank, four mounting screws 91 are provided. They are passed through holes in the gauge head and may be threaded into the tank.

Plastic cap 61 is optically clear in that area 93 of it which overlies the graduations on dial plate 31 so that the pointer 53 and the graduations are visible through the cap. It is preferably frosted, however, in its central area, the area overlying the resistance unit.

In use the gauge is secured to a tank and connected in series with a conventional electrically-actuated indicating device (not shown) located remote from the tank. A lead from post 76 is connected to said device. Assuming that the gauge has been mounted in a desired position on the storage tank variations in the level of the liquid in the tank will cause shaft 22 to be rotated in one direction or the other for an increase and a decrease in the liquid level, respectively. Rotation of shaft 22 and its magnet 24 produces a corresponding rotation of magnet 51. Rotation of magnet 51 causes pointer 53 and contact 58 to be rotated relative to the graduations (FIG. 1) on dial plate 31, and to the coil 72, respectively. Pointer 53 thereby furnishes a visual indication of the change in liquid level; and contact 56 an electrical indication by varying the value of the resistance in the circuit between terminal 76 and the remote indicating instrument.

From the foregoing, it will be noted that the manner in which the indicator unit 30 is suspended in casing 11 not only permits the delicate indicator mechanism to be readily removed and shipped separately from the gauge casing 11 if desired; but also serves to insulate the indicator unit from damage which might otherwise result from the shock loading of the assembled gauge. Also, by suspending the dial plate 31 in spaced relation to the bottom and sidewalls of the recess 12 in casing 11, much of the vibration which would normally pass from casing 11 to unit 30 if the two were in complete contact with one another, is eliminated; thereby resulting in more accurate operation of the unit 30. Moreover, by housing the wire resistance coil 72 on an annular core in cap 61, the unit is not only more compact, but the coiled wire 72 is supported so well that it is capable of withstanding a considerable amount of abuse. In addition, the utilization of both visual and electrical indicator units permits ready checking of the liquid level.

In the gauge described, the driven magnet 51, the contact spring 55, and the resistance coil 72 are all mounted coaxially and are, in effect, confined within a cylinder which has a diameter no greater than the diameter of the driven magnet itself. This arrangement achieves several advantages. It makes for compactness. There are fewer parts required. The force required to drive the contact point is slight, because of the small radius arm to the contact point 58. This makes for increased sensitivity in registry of the gauge. Moreover, it reduces the bearing load on the center pivot 36. It enables the drive to the indicator to be effected with a light torque magnet 24. The driving torque is further reduced by using a compass type pivot pin mounted at one end. Thus, a compact, rugged, sensitive design is attained with the smallest number of parts.

In the gauge disclosed, moreover, the ground contact 45 bears against the small diameter center pivot 36, to carry the electrical current across the pivot. Heretofore, it has been the practice either to use a coil or a flat spring, which presses vertically against the shaft, and thus builds up friction on the shaft, reducing the sensitivity of the unit, or to use a grounding wiper on a spring opposite the resistance wiper, the grounding wiper contacting a slip ring to carry the current, or to use a slip ring on the contact assembly with a stationary contact mounted in the housing. Either of the two latter constructions requires more parts and more space than the construction of the present invention. Moreover, with the prior constructions dirt tends to build up between the contact and the pivot, reducing the electrical contact.

The grounding contact is necessary because of the uncertainty of contact across a moving bearing. The wiping contact 45 of the disclosed structure maintains a clean contact surface. With this arrangement, moreover, no additional parts are required to provide the slip ring action, and moreover, the slip ring (pivot 36) has an extremely small diameter and provides the least amount of friction. The friction element in the slip ring is, of course, proportional to the pressure against the slip ring multipled by the torque arm from the center of the shaft. If the torque arm is reduced to the smallest possible value, the friction will be proportionately reduced.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A gauge comprising
(a) a housing having a transparent wall at one end thereof,
(b) a stationary pivot pin extending into said housing from the opposite end thereof,
(c) a dial in said housing facing said transparent wall and having graduations disposed coaxially about said pin,
(d) a first annular magnet mounted on said pin for rotation coaxially thereabout,
(e) a pointer mounted for rotation with said magnet and overlying the graduations on said dial to be readable thereagainst through said transparent wall,
(f) an arcuate resistor fixed in said housing coaxially of said pin,
(g) means to connect said resistor in circuit with an electrically operated indicator located remote from said housing,
(h) said means including an electrical contact element mounted in said housing to rotate with said magnet and having a contact point which rides along said resistor coaxially of said pin upon rotation of said magnet, said contact point being radially spaced inwardly from the outer peripheral surface of said first magnet, and
(i) a second magnet mounted at the exterior of said housing to rotate coaxially of said pin in response to a change in a condition existing at the exterior of said housing and being operative through magnetic coupling to impart its rotation to said first magnet,
(j) said means further including a leaf spring secured at one end to said first magnet for rotation therewith,
(k) said spring adjacent the opposite end thereof extending tangentially across said pin, and having sliding, tangential, point contact with the peripheral surface of said pivot pin upon rotation of said first magnet.

2. A gauge comprising
(a) a housing having a transparent wall at one end thereof,
(b) a stationary pivot pin extending into said housing from the opposite end thereof,
(c) a dial in said housing facing said transparent wall and having graduations disposed coaxially about said pin,
(d) a first annular magnet mounted on said pin for rotation coaxially thereabout,
(e) a pointer mounted for rotation with said magnet and overlying the graduations on said dial to be readable thereagainst through said transparent wall,
(f) an arcuate resistor fixed in said housing coaxially of said pin,
(g) means to connect said resistor in circuit with an electrically operated indicator located remote from said housing,
(h) said means including an electrical contact element mounted in said housing to rotate with said magnet and having a contact point which rides along said resistor coaxially of said pin upon rotation of said magnet, said contact point being radially spaced inwardly from the outer peripheral surface of said first magnet, and
(i) a second magnet mounted at the exterior of said housing to rotate coaxially of said pin in response to a change in a condition existing at the exterior of said housing and being operative through magnetic coupling to impart its rotation to said first magnet,
(j) said pin extending part way into said housing, and
(k) said first magnet being secured to an annular bearing which is rotatably mounted on the inner end of said pin, and
(l) said arcuate resistor being axially spaced from said first magnet and surrounding said bearing adjacent one end thereof, and
(m) said contact element being a leaf spring which extends across the axial space between said resistor and said first magnet, and which is secured at one end to said first magnet to rotate therewith and which carries at its free end said contact point, and which urges said contact point axially into engagement with said resistor at a point radially spaced between the outer peripheral surfaces of said magnet and bearing, respectively.

3. A gauge comprising
(a) a housing having a metallic wall at one end thereof,
(b) a stationary, metallic pivot pin secured at one end to said wall and extending into said housing,
(c) an annular member mounted on said pin for rotation coaxially thereabout in response to a change in a condition existing at the exterior of said housing, (d) an arcuate resistance element mounted in said housing coaxially of said pin, and in axially spaced relation to said member and adapted to be connected in circuit with an electrically operated indicator remote from said housing, (e) an electrical contact element secured at one end for rotation with said member and having a free end which extends across the axial space between said member and said resistor, said element having a contact point adjacent the free end thereof which lies radially inwardly from the outer peripheral surface of said annular member, and which engages said resistance element and rides therealong upon rotation of said member, and (f) means for grounding the opposite end of said contact element to said metallic wall including said annular member and (g) a leaf spring secured at one end to said annular member and having, adjacent its opposite end, sliding, tangential, point contact with the peripheral surface of said pin upon rotation of said annular member.

4. A condition-responsive device comprising a casing which is open at one end, (a) a first magnet rotatably mounted in said casing to be rotated in response to a change in a condition existing at the exterior of said casing, (b) a transparent cover sealing the open end of said casing, (c) a stationary pivot pin secured to said casing in axial alignment with the axis of rotation of said first magnet, (d) a second magnet mounted in said casing for rotation on said pin in response to the rotation of said first magnet, (e) an annular wire-wound resistance element, said wire-wound resistance element being secured in an annular recess in the bottom of said cover coaxially of said pin, (f) means to connect said resistance element in circuit with an electrically actuated meter disposed externally of said casing, (g) said means including first and second electrical contacts, respectively, mounted in said casing for rotation with said second magnet, (h) said first contact having a point thereon engaging the resistance element and ridable therealong coaxially of said pin upon rotation of said second magnet, and (i) said second contact engaging and slidable on the peripheral surface of said pin upon rotation of said second magnet.

5. A gauge comprising (a) a first casing, (b) a first magnet mounted in a recess in one end of said casing and adapted to be rotated relative thereto in response to a change in a condition existing remote from said casing, (c) a second casing of generally cup-shaped configuration and having a plurality of indicia on the inner face thereof, (d) means suspending said second casing in a further recess in the opposite end of said first casing with said indicia facing the open end of said further recess, (e) a transparent cover sealingly secured in the open end of said second casing to provide a sealed chamber therein, (f) a resistor coil mounted in said cover to be connected in circuit with an electrically operated meter disposed remote from said chamber, (g) a second, annular, magnet rotatably mounted in said chamber coaxially of the axis of rotation of said first magnet and rotatable therewith, (h) first and second indicator elements operatively secured to said second magnet and rotatable therewith, (i) said first element comprising a pointer readable against the indicia on said second casing, and (j) said second element comprising an electrical contact having a point thereon which is radially spaced inwardly from the outer peripheral surface of said second magnet and which engages and rides along said coil upon rotation of said second magnet.

6. A gauge comprising (a) a housing, (b) a graduated dial in said housing (c) an annular driven magnet rotatably mounted in said housing, (d) a pointer mounted coaxially of said driven magnet for rotation with said driven magnet to read against the graduations of said dial, (e) an arcuate resistance member mounted in said casing coaxially of said driven magnet and axially spaced therefrom, (f) a contact member mounted coaxially of said driven magnet for rotation with said driven magnet in the axial space between the latter and said resistance member, and having thereon a contact point adapted to ride on said resistance member, said contact member and resistance member together constituting a variable resistor, (g) means for connecting said resistor in circuit with an electrically operated indicator remote from said housing, and (h) a drive magnet movably mounted externally of said housing and magnetically coupled to said driven magnet to effect rotation of said driven magnet upon movement of said drive magnet, said drive magnet being mounted for movement in response to variations in an external condition which are to be measured, (i) the resistance member and the contact member both lying within an imaginary cylinder coaxial with the driven magnet, and whose diameter is not greater than that of the driven magnet, (j) said driven magnet being rotatably mounted in said housing on a stud which is secured at one end in said housing, said housing having (k) a cover removably secured thereto, said cover being in part, at least, transparent to permit viewing said dial and pointer, and (l) said resistance member being mounted in a circular recess in said cover to be removable therewith.

7. A gauge as claimed in claim 6 wherein said driven magnet is rotatably mounted on said stud by means of (a) a bushing which is rotatable on said stud and to which the driven magnet is secured, (b) said pointer and said contact member are secured to said driven magnet, and said bushing extends at one end into a recess in said cover disposed centrally of said circular recess.

8. A gauge comprising (a) a housing (b) an annular driven magnet rotatably mounted in said housing, (c) an arcuate resistance element mounted in said housing coaxially of said driven magnet and axially spaced therefrom, (d) a contact member mounted coaxially of said driven magnet for rotation with said driven magnet in the axial space between the latter and said resistance element, and having thereon a contact point adapted to ride on said resistance element, said contact member and resistance element together constituting a variable resistor, (e) means for connecting said resistor in circuit with an electrically operated indicator remote from said housing, and (f) a drive magnet movably mounted externally of said housing and magnetically coupled to said driven magnet to effect rotation of said driven magnet upon movement of said drive magnet, said drive magnet being mounted for movement in response to variations in an external condition to be measured, (g) the resistance element and the contact member both lying within imaginary cylinder coaxial with the driven magnet and whose diameter is no greater than that of the driven magnet, said driven magnet being rotatably mounted in said housing on a stud which is secured at one end in said housing and having a spring contact member secured at one end to said driven magnet for rotation therewith disposed to ride adjacent its opposite end with tangential, point contact on the periphery of said stud to ground the first-named contact member to said housing.

References Cited by the Examiner

UNITED STATES PATENTS

| | | | |
|---|---|---|---|
| 1,247,317 | 11/17 | Nakamigawa | 73—313 |
| 1,304,022 | 5/19 | Cole | 73—313 X |
| 1,753,917 | 4/30 | Cheney | 73—313 |
| 2,716,685 | 8/55 | Hastings | 73—313 X |
| 2,992,560 | 7/61 | Morgan et al | 73—317 |

ISAAC LISANN, *Primary Examiner.*

ROBERT L. EVANS, *Examiner.*